(12) United States Patent
He et al.

(10) Patent No.: US 7,826,576 B1
(45) Date of Patent: Nov. 2, 2010

(54) CHANNEL EQUALIZATION IN RECEIVERS

(75) Inventors: Runsheng He, Sunnyvale, CA (US);
Jing Fang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/642,443

(22) Filed: Dec. 18, 2009

Related U.S. Application Data

(63) Continuation of application No. 11/291,584, filed on Nov. 30, 2005, now Pat. No. 7,646,833.

(60) Provisional application No. 60/684,093, filed on May 23, 2005.

(51) Int. Cl.
*H04B 1/10* (2006.01)

(52) U.S. Cl. .................................................. 375/350

(58) Field of Classification Search ................. None
See application file for complete search history.

(56) References Cited

U.S. PATENT DOCUMENTS

| 6,771,591 | B1 | 8/2004 | Belotserkovsky et al. |
| 6,961,372 | B2 | 11/2005 | Liang |
| 7,023,928 | B2 | 4/2006 | Laroia et al. |
| 7,028,232 | B2 * | 4/2006 | Kyosti et al. ................ 714/704 |
| 7,031,250 | B2 | 4/2006 | Vandenameele-Lepla |
| 7,136,111 | B2 * | 11/2006 | Kim ............................. 348/614 |
| 7,342,974 | B2 | 3/2008 | Chiou |
| 2004/0264605 | A1 * | 12/2004 | Kyosti et al. ................ 375/340 |

OTHER PUBLICATIONS

IEEE Computer Society, "*IEEE Standard for Local and Metropolitan Area Networks; Part 16: Air Interface for Fixed Broadband Wireless Access Systems*", Oct. 1, 2004, IEEE Std 802.16.
European Broadcasting Union, Final draft ETSI EN 300 744 V1.5.1 (Jun. 2004), "Digital Video Broadcasting (DVB); Framing Structure, Channel Coding and Modulation for Digital Terrestrial Television", 2004-2006, published online at http://www.etsi.org, 64 pages.

* cited by examiner

*Primary Examiner*—Khanh C Tran

(57) ABSTRACT

Systems and techniques relating to channel equalization in received communications signals are described. In one aspect, a communications signal of a channel is obtained and channel effects are removed from the communications signal by generating one or more time-varying channel response estimates.

20 Claims, 6 Drawing Sheets

CHANNEL EQUALIZATION IN RECEIVERS

CROSS REFERENCE TO RELATED APPLICATIONS

This application is a continuation of and claims the benefit of the priority of U.S. patent application Ser. No. 11/291,584, filed Nov. 30, 2005, entitled "Channel Equalization in Receivers", which claims the benefit of the priority of U.S. Provisional Patent Application Ser. No. 60/684,093, filed May 23, 2005, and entitled "An OFDM Receiver for Timing-Varying Channels"; both prior applications are hereby incorporated by reference.

BACKGROUND

This document relates to channel equalization in receivers.

When a signal is transmitted over a channel, the received signal may be different from the transmitted signal. For example, a signal transmitted wirelessly may be attenuated by the time it reaches a receiver. These changes to the transmitted signal are called channel effects. If, for example, a transmitter or a receiver are moving during transmission or reception, respectively, the channel effects may include Doppler effects.

Receivers may employ systems and techniques to model these channel effects and remove or reduce them through channel equalization.

SUMMARY

According to an aspect of the described systems and techniques, a method includes obtaining a communications signal of a channel and removing, in the frequency domain, channel effects from the communications signal, where the removing includes generating, in the time domain, one or more time-varying channel response estimates.

In some implementations, the removing channel effects also includes estimating a time-invariant channel response based at least in part on the communications signal; generating a first estimated signal based at least in part on the time-invariant channel response; and generating a second estimated signal based at least in part on a first time-varying channel response. Also, the generating one or more time-varying channel response estimates can include generating the first time-varying channel response based at least in part on the first estimated signal.

In some implementations of the method, the obtaining the communications signal includes receiving the communications signal.

In some implementations, the removing channel effects also includes generating a second time-varying channel response based at least in part on the second estimated input signal and generating a third estimated input signal based at least in part on the second time-varying channel response.

In some implementations, the removing channel effects also includes iteratively generating additional time-varying channel responses and additional estimated input signals until a final estimated input signal is determined to be acceptable based at least in part on one of the generated additional estimated input signals.

In some implementations, the estimating a time-invariant channel response includes receiving one or more pilot signals on one or more subcarrier signals.

In some implementations, the generating a first estimated input signal includes performing channel equalization using the time-invariant channel response.

In some implementations, the generating the first time-varying channel response includes performing a least-mean-squared technique.

In some implementations, the generating a second estimated input signal includes performing channel equalization using the first time-varying channel response.

According to an aspect of the described systems and techniques, a method includes: receiving a communications signal comprising one or more pilot signals on one or more subcarrier signals; estimating a time-invariant channel response based at least in part on the one or more pilot signals; generating a first estimated frequency-domain source signal based at least in part on the time-invariant channel response; generating a first estimated time-domain source signal based at least in part on the first estimated frequency-domain source signal; estimating a time-varying time-domain channel response using a least-mean-squared technique; generating a time-varying frequency-domain channel response based at least in part on the time-varying time-domain channel response; and generating a second estimated frequency-domain source signal based at least in part on the time-varying frequency domain channel response.

In some implementations, the generating a first estimated time-domain source signal includes performing a one-dimensional Inverse Fast Fourier Transform technique; and the generating a time-varying frequency-domain channel response includes performing a two-dimensional Fast Fourier Transform technique.

According to an aspect of the described systems and techniques, an apparatus includes an input configured to obtain a communications signal of a channel, and a channel equalizer configured to remove, in the frequency domain, channel effects from the communications signal using one or more time-varying time-domain channel response estimates.

In some implementations, the channel equalizer includes: a first equalization unit configured to perform a time-invariant equalization and to be responsive to a time-invariant channel response; an estimation unit configured to generate a time-varying channel response and to be responsive to an output of the first equalization unit; and a second equalization unit configured to perform a time-varying equalization and to be responsive to an output of the estimation unit.

In some implementations, the apparatus also includes a first decision unit responsive to an output of the second equalization unit.

In some implementations, the channel equalizer also includes a second decision unit responsive to an output of the first equalization unit.

In some implementations, the estimation unit includes a least-mean-squared unit.

In some implementations, the channel equalizer also includes an initial response estimator configured to estimate the time-invariant channel response based on one or more pilot signals.

In some implementations, the channel equalizer also includes: a one-dimensional Fast Fourier Transform unit; a one-dimensional Inverse Fast Fourier Transform unit; and a two-dimensional Fast Fourier Transform unit.

In some implementations, the input configured to obtain the communications signal is configured to receive the communications signal of the channel.

According to an aspect of the described systems and techniques, an apparatus includes a means for obtaining a communications signal of a channel and a means for removing, in the frequency domain, channel effects from the communications signal, the means for removing comprising a means for generating, in the time domain, one or more time-varying channel response estimates.

In some implementations, the means for removing channel effects also includes: a means for estimating a time-invariant channel response based at least in part on the communications signal; a means for generating a first estimated signal based at least in part on the time-invariant channel response; and a means for generating a second estimated signal based at least in part on a first time-varying channel response. Also, the means for generating one or more time-varying channel response estimates can include a means for generating the first time-varying channel response based at least in part on the first estimated signal.

In some implementations, the means for obtaining the communications signal includes a means for receiving the communications signal.

In some implementations, the means for removing channel effects also includes a means for generating a second time-varying channel response based at least in part on the second estimated input signal and a means for generating a third estimated input signal based at least in part on the second time-varying channel response.

In some implementations, the means for removing channel effects also includes a means for iteratively generating additional time-varying channel responses and additional estimated input signals until a final estimated input signal is determined to be acceptable based at least in part on one of the generated additional estimated input signals.

In some implementations, the means for estimating a time-invariant channel response includes a means for receiving one or more pilot signals on one or more subcarrier signals.

In some implementations, the means for generating a first estimated input signal includes a means for performing channel equalization using the time-invariant channel response.

In some implementations, the means for generating the first time-varying channel response includes a means for performing a least-mean-squared technique.

In some implementations, the means for generating a second estimated input signal includes a means for performing channel equalization using the first time-varying channel response.

According to an aspect of the described systems and techniques, an apparatus includes: a means for receiving a communications signal comprising one or more pilot signals on one or more subcarrier signals; a means for estimating a time-invariant channel response based at least in part on the one or more pilot signals; a means for generating a first estimated frequency-domain source signal based at least in part on the time-invariant channel response; a means for generating a first estimated time-domain source signal based at least in part on the first estimated frequency-domain source signal; a means for estimating a time-varying time-domain channel response using a least-mean-squared technique; a means for generating a time-varying frequency-domain channel response based at least in part on the time-varying time-domain channel response; and a means for generating a second estimated frequency-domain source signal based at least in part on the time-varying frequency domain channel response.

In some implementations, the means for generating a first estimated time-domain source signal includes a means for performing a one-dimensional Inverse Fast Fourier Transform technique and the means for generating a time-varying frequency-domain channel response includes a means for performing a two-dimensional Fast Fourier Transform technique.

According to an aspect of the described systems and techniques, a system includes an antenna configured to obtain a communications signal of a channel and a channel equalizer configured to remove, in the frequency domain, channel effects from the communications signal using one or more time-varying time-domain channel response estimates.

In some implementations of the system, the channel equalizer includes: a first equalization unit configured to perform a time-invariant equalization and to be responsive to a time-invariant channel response; an estimation unit configured to generate a time-varying channel response and to be responsive to an output of the first equalization unit; and a second equalization unit configured to perform a time-varying equalization and to be responsive to an output of the estimation unit.

In some implementations, the system also includes a first decision unit responsive to an output of the second equalization unit.

In some implementations of the system, the channel equalizer also includes a second decision unit responsive to an output of the first equalization unit.

In some implementations of the system, the estimation unit includes a least-mean-squared unit.

In some implementations of the system, the channel equalizer also includes an initial response estimator configured to estimate the time-invariant channel response based on one or more pilot signals.

In some implementations of the system, the channel equalizer also includes: a one-dimensional Fast Fourier Transform unit; a one-dimensional Inverse Fast Fourier Transform unit; and a two-dimensional Fast Fourier Transform unit.

In some implementations of the system, the antenna configured to obtain the communications signal is configured to receive the communications signal of the channel.

The described systems and techniques can result in one or more of the following advantages. Channel effects acting on a transmitted signal can be reduced or removed. Examples of channel effects that may be reduced or removed include Doppler effects and other time-varying channel effects.

The described systems and techniques can be implemented in electronic circuitry, computer hardware, firmware, software, or in combinations of them, such as the structural means disclosed in this specification and structural equivalents thereof. This can include a program operable to cause one or more machines (e.g., a signal processing device) to perform operations described. Thus, program implementations can be realized from a disclosed method, system, or apparatus, and apparatus implementations can be realized from a disclosed system, program, or method. Similarly, method implementations can be realized from a disclosed system, program, or apparatus, and system implementations can be realized from a disclosed method, program, or apparatus.

For example, the disclosed embodiment(s) below can be implemented in various systems and apparatus, including, but not limited to, a special purpose programmable machine (e.g., a wireless access point, a router, a switch, a remote environment monitor), a mobile data processing machine (e.g., a wireless client, a cellular telephone, a personal digital assistant (PDA), a mobile computer, a digital camera), a general purpose data processing machine (e.g., a minicomputer, a server, a mainframe, a supercomputer), or combinations of these.

The details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

Figure 1A:
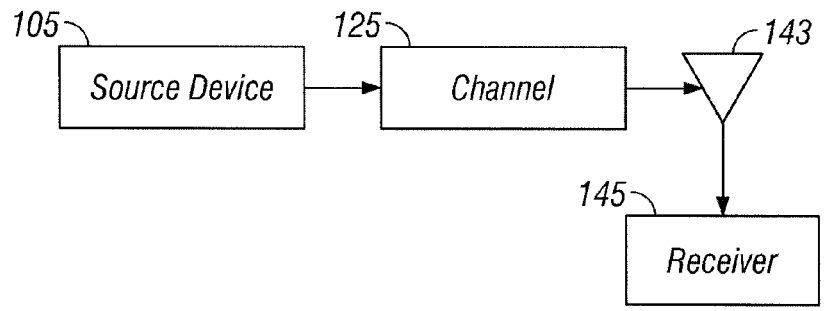
FIG. 1A is a block diagram of a signal transmission and reception system.
Figure 1B:
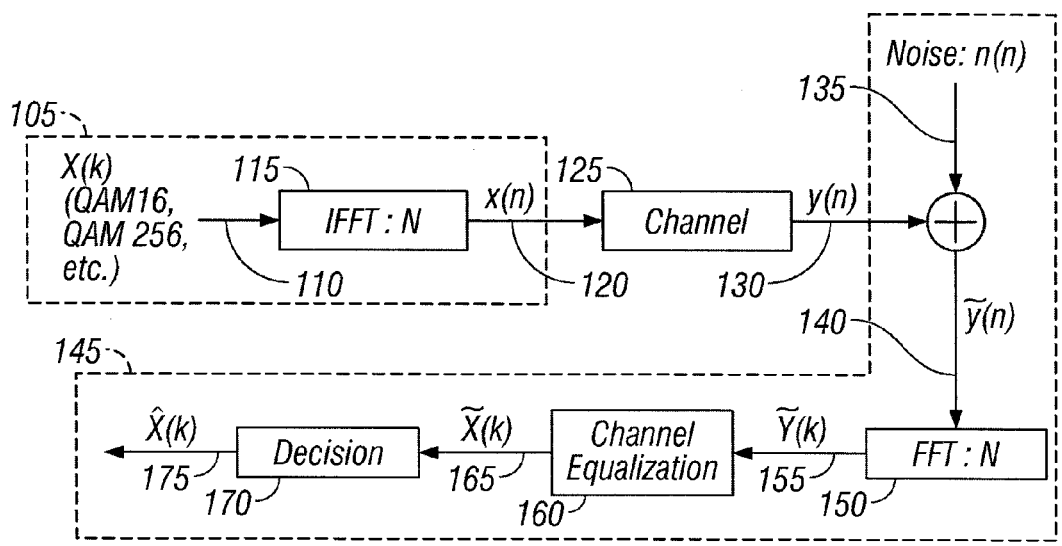
FIG. 1B is a diagram showing channel equalization in a signal (e.g., orthogonal frequency-division multiplexed (OFDM) signal) transmission and reception system.

FIGS. 1A and 1B depict a transmission and reception system. A source device 105 may transmit a signal (e.g., orthogonal frequency-division multiplexed (OFDM) signal) over a channel 125 to a receiver 145. Receiver 145 may obtain the signal via input 143. In some implementations, if the channel comprises wireless transmission, input 143 may be an antenna. In some implementations, e.g., transmission over a cable, input 143 may be an connector attached to the cable. In some implementations, e.g., transmission via satellite, input 143 may be a satellite reception dish.

A source device 105 may process a frequency-domain source signal X(k) 110 to be transmitted. Signal X(k) 110 may be modulated, e.g., by quadrature amplitude modulation techniques such as QAM16 (16-QAM) or QAM256 (256-QAM), or by other modulation techniques. Signal X(k) may be transformed into the time-domain using, for example, an Inverse Fast Fourier Transform (IFFT) unit 115, resulting in a time-domain source signal x(n) 120.

Time-domain source signal x(n) 120 may be sent over channel 125 and may be received at receiver 145. Channel 125 may be a conventional radio frequency channel or it may be another transmission channel, e.g., cable, satellite, etc. Different channels may modify the signal by introducing different channel effects. For example, some channels may attenuate the signal. The received signal y(n) 130 arriving at receiver 145 may thus be different from the time-domain source signal x(n) 120.

Components within receiver 145 may introduce noise into the system. Various noise components may be modeled in this description by adding a noise signal n(n) 135 to received signal y(n) 130. Thus, the modeled received signal ỹ(n) 140 at receiver 145 may be represented as $$\tilde{y}(n) = y(n) + n(n). \tag{1}$$

The modeled received signal ỹ(n) 140 may be transformed into frequency domain signal Ỹ(k) 155, for example by using a Fast Fourier Transform unit 150. The receiver 145 may perform channel equalization 160 to compensate for channel effects, producing an equalized receive signal X̃(k) 165. The equalized received signal X̃(k) 165 may then be processed by a decision block 170 (e.g., a Viterbi decoder).

Decision block 170 may be used to remove noise from the equalized received signal X̃(k) 165. For example, suppose a transmitted binary signal consisted of two values, 0 volts and 1 volt. As a result of noise, the equalized received binary signal may comprise values other than exactly 0 and 1. Thus, for example, if 0.2 V were received, decision block 170 can be used to interpret/decode the received signal to be an intended value of 0. Similarly, if 0.8 V were received, decision block 170 can interpret/decode the received value to be the intended value of 1. Decision block 170 may be implemented using one or more of several algorithms, such as, in one implementation, using a slicer technique or a Viterbi algorithm. The decoded signal X̂(k) 175 resulting from decision block 170 may be close to or identical to frequency-domain source signal X(k) 110.

The channel equalization block 160 may be implemented in several ways. For example, assuming channel 125 has time-invariant channel effects, the impulse response for the channel may be represented as h(l). This may be represented in the frequency domain by H(k), which results from the N-point FFT of h(l):

$$H(k) = \sum_{n=0}^{N-1} h(n) \cdot w^{k \cdot n}, \quad k = 0, 1, \ldots N-1. \tag{2}$$
$$w = e^{-j \cdot 2\pi/N}$$

Received signal y(n) 130 may then be represented in the frequency domain as:

$$Y(k) = X(k) \cdot H(k). \tag{3}$$

The frequency-domain representation Ỹ(k) 155 of the modeled received signal ỹ(n) 140 may then be represented as $$\tilde{Y}(k) = X(k) \cdot H(k) + N(k). \tag{4}$$

H(k) can be determined by transmitting a known pilot signal on a set of subcarriers. The pilot signal may be in either the time-domain or the frequency domain. In the frequency-domain, a particular frequency may contain the pilot signal, which may be specified by a standard, e.g., the Digital Video Broadcasting (DVB) standard from the European Telecommunications Standards Institute (ETSI).

Having determined H(k), channel equalization may be performed according to the following equation:

$$\tilde{X}(k) = \tilde{Y}(k)/H(k). \tag{5}$$

In many applications, however, the channel cannot be considered to be time-invariant. For example, for a moving receiver 145 (e.g., in a car) the Doppler effect may cause channel effects for a wireless channel to be time-varying. Other factors, such as changes in electromagnetic field or changes in temperature may also cause time-varying channel effects.

For time-varying channels, the impulse response of the channel may be represented as h(n,l), where n represents time and l represents delay.

Because the channel effects are time-varying, the subcarriers are not orthogonal, and the system may be modeled as:

$$\tilde{Y}(k) = \sum_{i=0}^{N-1} X(i) \cdot H_2(k-i, i) + N(k), \tag{6}$$

where $H_2(k,i)$ is the 2-dimensional FFT of h(n,l) and can be represented as:

$$H_2(k, i) = \sum_{n=0}^{N-1} \sum_{l=0}^{N-1} h(n, l) \cdot w^{l \cdot k} \cdot w^{n \cdot i}. \tag{7}$$

Although $H_2(k,i)$ cannot be accurately estimated by pilot subcarriers, it may be estimated directly by estimating $h(n,l)$. Equation (6) may be written in the time-domain as:

$$\tilde{y}(n) = \sum_{l=0}^{L} h(n,l) \cdot x(n-l) + n(n). \quad (8)$$

If $x(n)$ is known, then a least-mean-squared (LMS) algorithm can be used to adaptively track $h(n,l)$:

$$h(n+1,l) = h(n,l) + \mu \cdot (\tilde{y}(n) - y(n)) \cdot x(n-l), \; l=0, \ldots L-1 \quad (9)$$

$$\text{where } y(n) = \sum_{l=0}^{L} h(n,l) \cdot x(n-l)$$

and where $\mu$ is the LMS step size.

Figure 2:
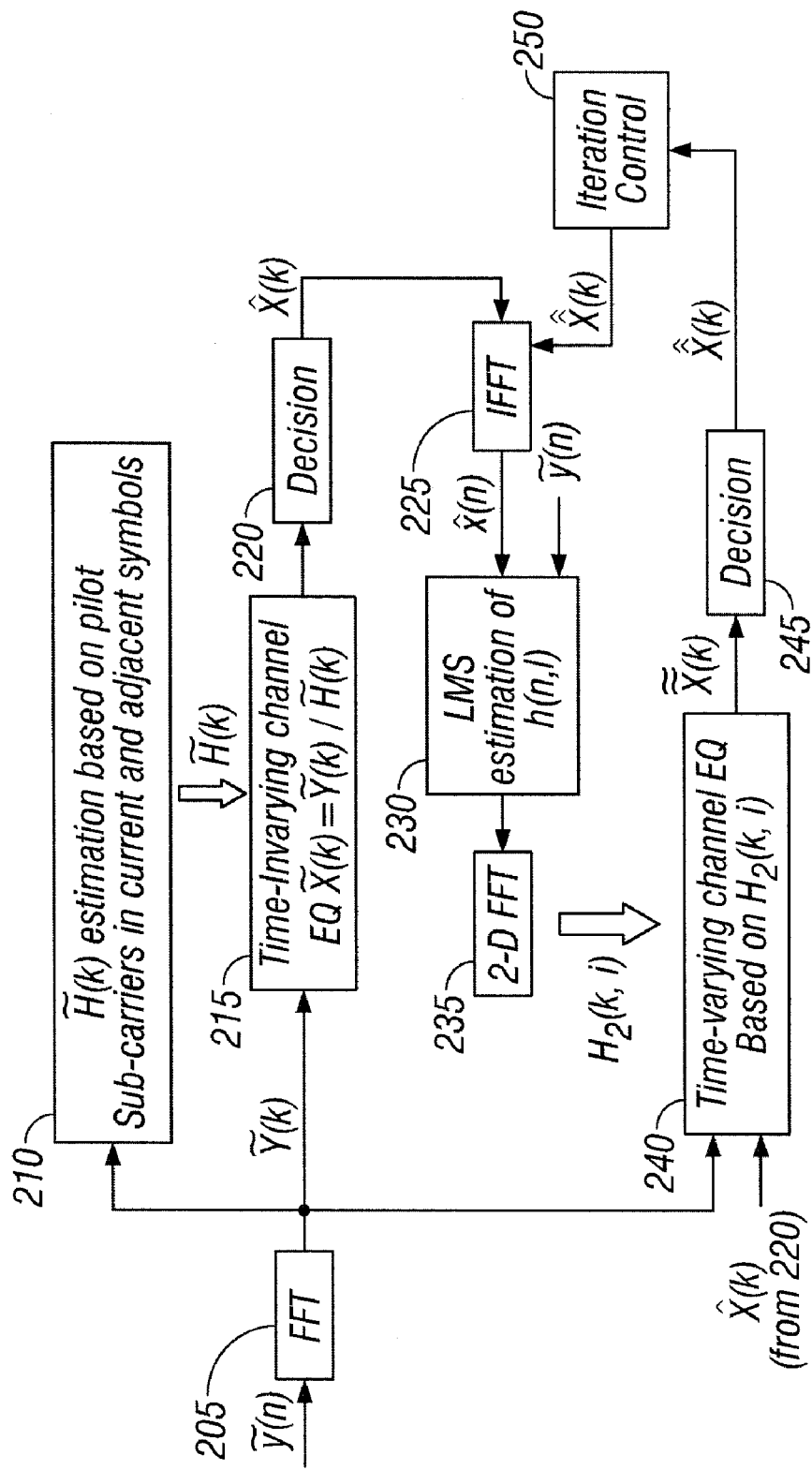
FIG. 2 shows a system for channel equalization.

FIG. 2 shows a system for estimating the equalized received signal $\hat{X}(k)$ 165. At 205, $\tilde{Y}(k)$ 155 is generated by taking the FFT of modeled received signal $\tilde{y}(n)$. At 210, $\hat{H}(k)$ is estimated based on pilot subcarriers in both the current and adjacent symbols. At 215, if the channel is assumed to be time-invariant, $\hat{X}(k)$ may be estimated:

$$\tilde{X}(k) = \tilde{Y}(k)/\hat{H}(k). \quad (10)$$

In some implementations, a time-varying channel equalization can be applied at 215 if a time-varying model is available. Such implementations may be useful in several technologies, including those related to WiMAX and the Institute of Electrical and Electronics Engineers, Inc., (IEEE) Standard 802.16(e).

At 220, a decision block generates $\hat{X}(k)$, for example according to a slicer technique or a Viterbi algorithm. At 225, the time-domain representation $\hat{x}(n)$ may be generated by implementing IFFT($\hat{X}(k)$).

At 230, $h(n,l)$ may be estimated using $\hat{x}(n)$ in the LMS algorithm of equation (9). At 235, $H_2(k,i)$ may be generated by implementing the two-dimensional FFT of $h(n,l)$.

At 240, a time-varying channel equalization is performed using equation (6) based on the estimated time-varying transfer function $H_2(k,i)$ (calculated at 235), signal $\hat{X}(k)$ (calculated at 220), and signal $\tilde{Y}(k)$ (calculated at 205). The equalized signal may be represented $\tilde{X}(k)$ At 245, signal $\hat{X}(k)$ is generated by implementing a decision procedure on equalized signal $\tilde{X}(k)$. This decision procedure may be the same as or similar to the decision procedure implemented at 220.

An iteration control 250, determines whether to perform another iteration using $\hat{X}(k)$ (calculated at 245) as the input to the IFFT at 225. In some implementations, $\tilde{X}(k)$ (calculated at 240) may be used instead as the input to the IFFT at 225. Because iterations may be costly in terms of both time and hardware, it may be sufficient to perform only one or two iterations. In some implementations, an LMS error may be calculated between particular signals of successive iterations (e.g., between equalized signals such as $\tilde{X}(k)$, decision signals such as $\hat{X}(k)$, etc.). Iteration control 250 may continue iterations until a particular LMS error threshold is met. The resulting equalized signal generated at the end of the process may be a statistically close estimate of source signal 110.

Some implementations need not perform all the operations depicted in FIG. 2 or described herein. For example, in some implementations, the determination at iteration control 250 of whether to loop back in the process is not performed (i.e., single iteration systems).

Figure 3:
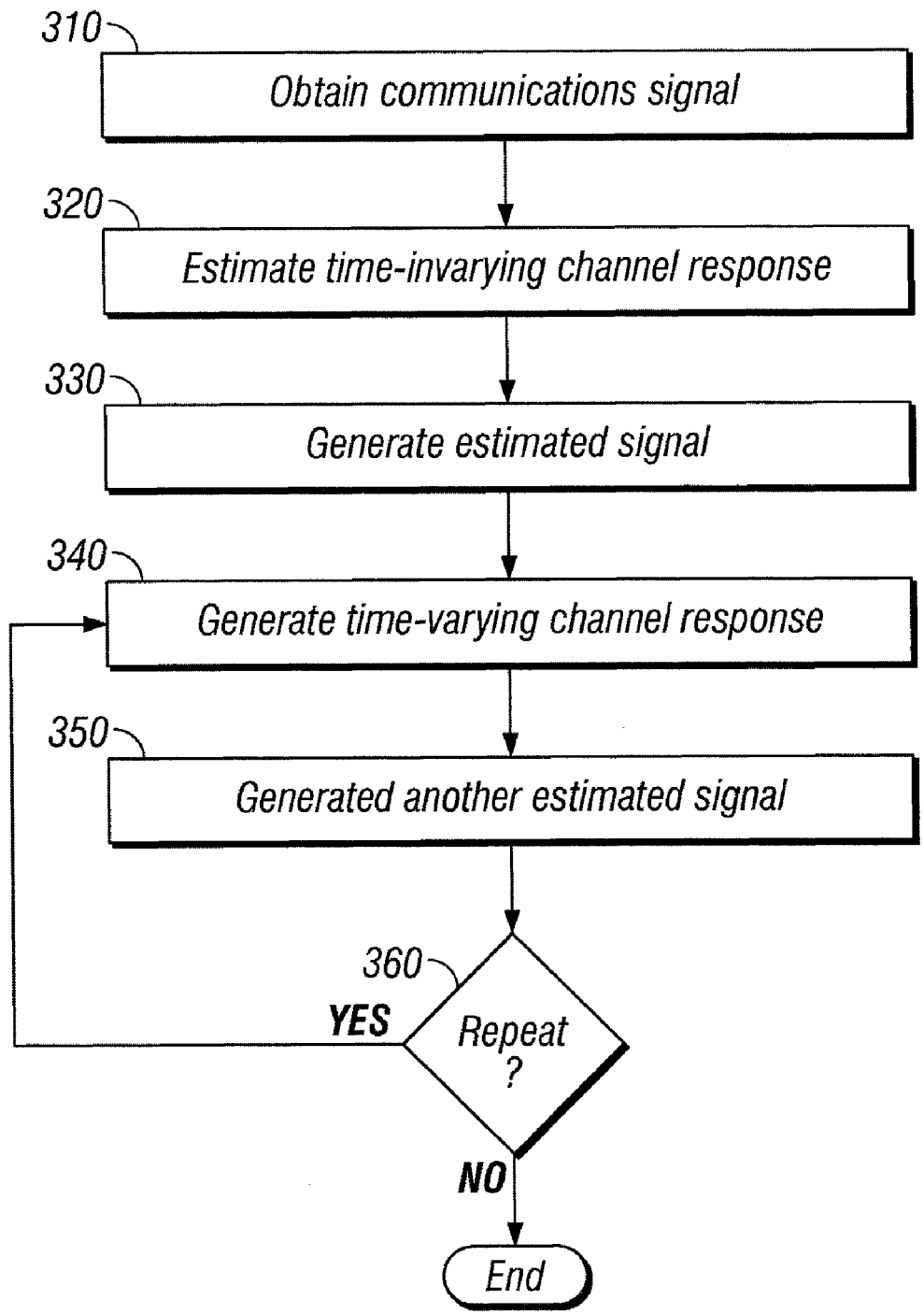
FIG. 3 shows a process for channel equalization.

FIG. 3 shows a process for channel equalization. At 310, a communications signal of a channel may be obtained (e.g., by receiver 145). At 320, a time-invariant channel response may be estimated based at least in part on the communications signal (e.g., by channel equalization unit 160, unit 210). A first estimated signal may be generated based at least in part on the time-invariant channel response at 330 (e.g., by channel equalization unit 160, unit 215, unit 220). At 340, a first time-varying channel response may be generated based at least in part on the first estimated signal (e.g., by channel equalization unit 160, unit 230). At 350, a second estimated signal may be generated based at least in part on the first time-varying channel response (e.g., by channel equalization unit 160, unit 240, unit 245).

At 360, a determination may be made whether to perform another iteration of the process (e.g., by channel equalization unit 160, iteration control 250). If another iteration is to be made, a second time-varying channel response may be generated at 340 (e.g., by channel equalization unit 160, unit 230) based at least in part on the second estimated signal, and, at 350, a third estimated signal may be generated (e.g., by channel equalization unit 160, unit 240, unit 245) based at least in part on the second time-varying channel response.

Some implementations may not perform some of the operations depicted in FIG. 3 or described herein. For example, in some implementations, the determination at 360 of whether to loop back into the process is not performed (i.e., single iteration systems).

Figure 4A:
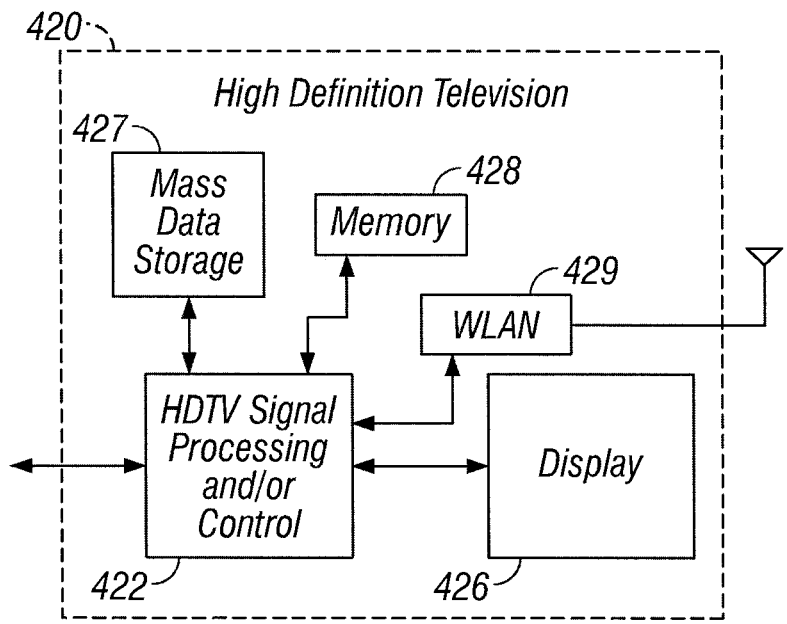
FIGS. 4A-4E show various exemplary implementations of the described systems and techniques.

FIGS. 4A-4E show various exemplary implementations of the described systems and techniques. Referring now to FIG. 4A, the described systems and techniques (e.g., associated with receiver 100) can be implemented in a high definition television (HDTV) 420. The described systems and techniques may be implemented in either or both signal processing and/or control circuits, which are generally identified in FIG. 4A at 422, a WLAN (wireless local area network) interface 429 and/or mass data storage 427 of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The mass data storage 427 may be a hard disk drive (HDD), such as a mini HDD that includes one or more platters having a diameter that is smaller than approximately 1.8". The HDTV 420 may be connected to memory 428 such as random access memory (RAM), read only memory (ROM), low latency nonvolatile memory such as flash memory and/or other suitable electronic data storage. The HDTV 420 also may support connections with a WLAN via a WLAN network interface 429.

Figure 4B:
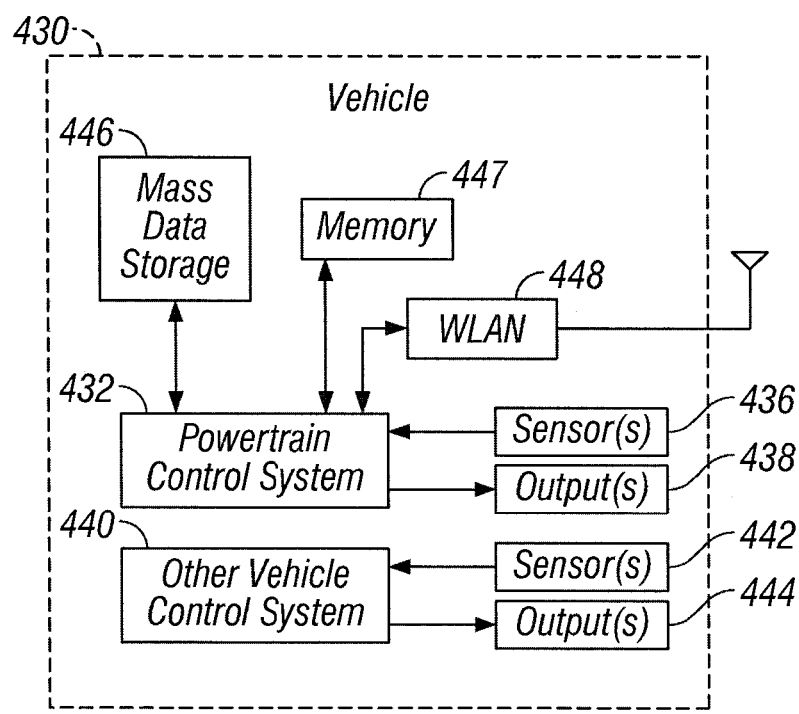

Referring now to FIG. 4B, the described systems and techniques may be implemented in a control system of a vehicle 430, a WLAN interface 448 and/or mass data storage 446 of the vehicle control system. In some implementations, the described systems and techniques are implemented in a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The described systems and techniques may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, digital versatile disc (DVD), compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 4C:
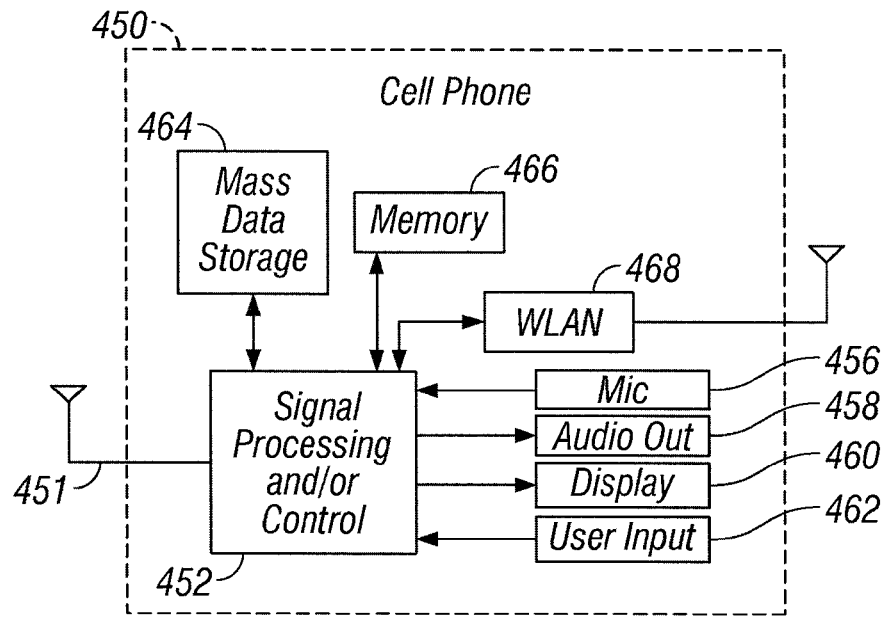

Referring now to FIG. 4C, the described systems and techniques can be implemented in a cellular phone 450 that may include a cellular antenna 451. The described systems and techniques may be implemented in either or both signal processing and/or control circuits, which are generally identified in FIG. 4C at 452, a WLAN interface 468 and/or mass data storage 464 of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 4D:
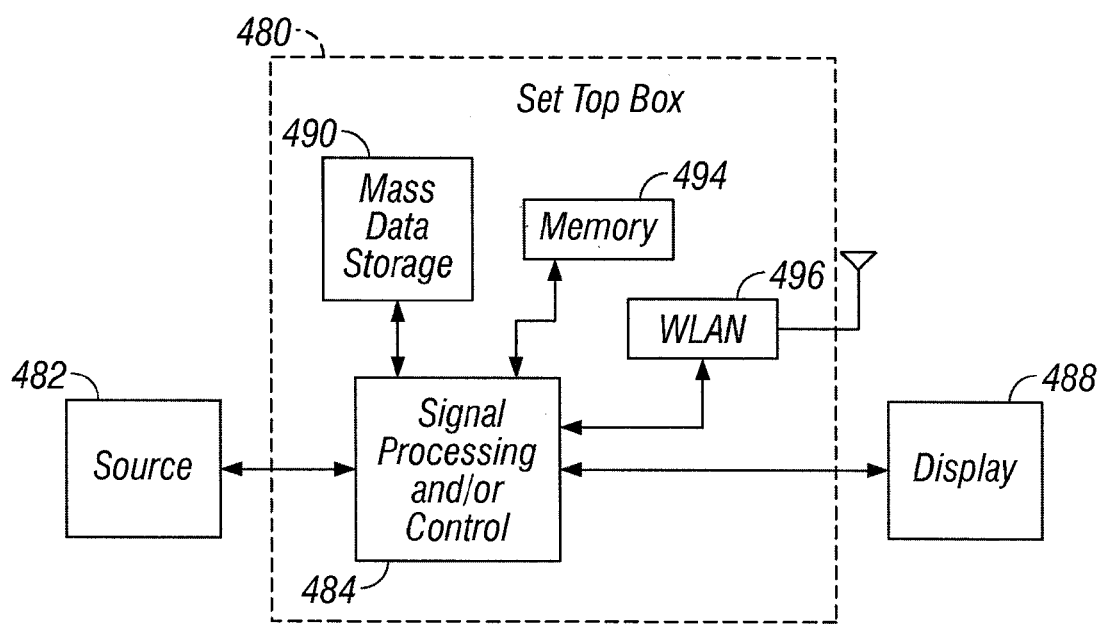

Referring now to FIG. 4D, the described systems and techniques can be implemented in a set top box 480. The described systems and techniques may be implemented in either or both signal processing and/or control circuits, which are generally identified in FIG. 4D at 484, a WLAN interface 496 and/or mass data storage 490 of the set top box 480. The set top box 480 receives signals from a source 482 such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 4E:
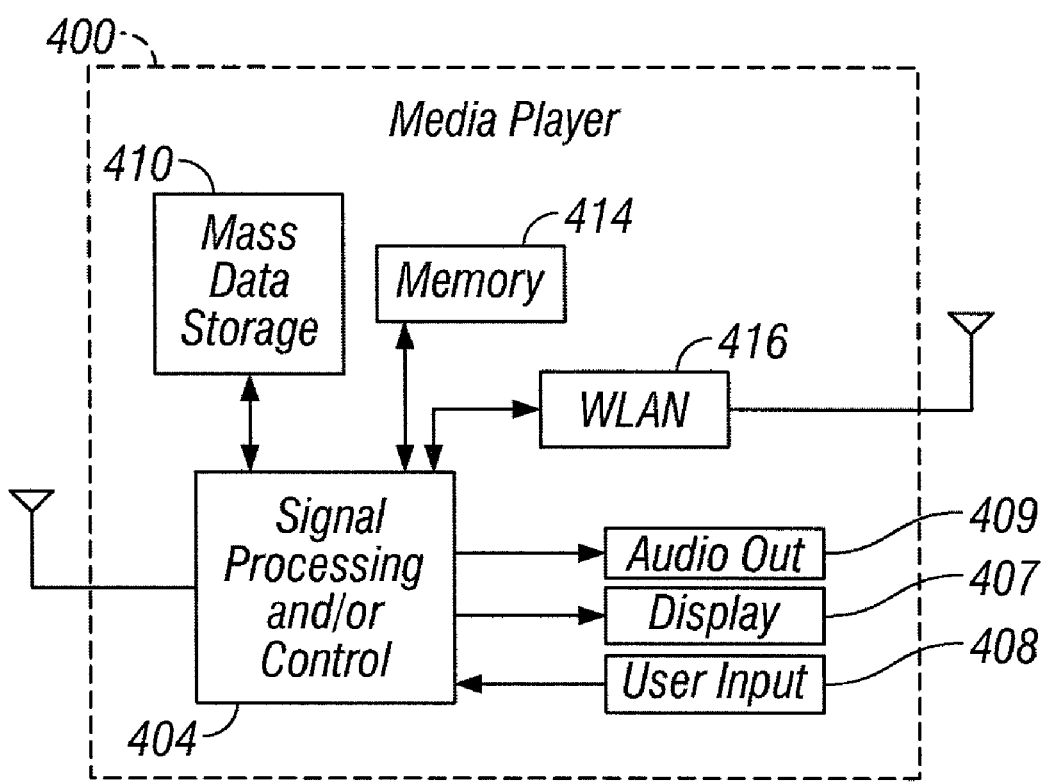

Referring now to FIG. 4E, the described systems and techniques can be implemented in a media player 400. The described systems and techniques may be implemented in either or both signal processing and/or control circuits, which are generally identified in FIG. 4E at 404, a WLAN interface 416 and/or mass data storage 410 of the media player 400. In some implementations, the media player 400 includes a display 407 and/or a user input 408 such as a keypad, touchpad and the like. In some implementations, the media player 400 may employ a graphical user interface (GUI) that typically employs menus, drop down menus, icons and/or a point-and-click interface via the display 407 and/or user input 408. The media player 400 further includes an audio output 409 such as a speaker and/or audio output jack. The signal processing and/or control circuits 404 and/or other circuits (not shown) of the media player 400 may process data, perform coding and/or encryption, perform calculations, format data and/or perform any other media player function.

The media player 400 may communicate with mass data storage 410 that stores data such as compressed audio and/or video content in a nonvolatile manner. In some implementations, the compressed audio files include files that are compliant with MP3 (Moving Picture experts group audio layer 4) format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 400 may be connected to memory 414 such as RAM, ROM, low latency nonvolatile memory such as flash memory and/or other suitable electronic data storage. The media player 400 also may support connections with a WLAN via a WLAN network interface 416. Still other implementations in addition to those described above are contemplated.

A number of implementations have been described. Nevertheless, it will be understood that various modifications can be made without departing from the spirit and scope of the disclosure. For example, one or more of the receivers described above can be embodied in a number of different ways. A receiver may be embodied as part of an integrated circuit on a single piece of silicon, where one or many circuits can be formed on a single silicon substrate, and other digital components used for the communication can also be formed on the substrate. In addition, however, a receiver can be embodied as discrete components, e.g., defined using hardware definition language, or by a suitably programmed digital signal processor, or in software executed by a general purpose processor. The processor can be configured to simulate the results of the receiver, e.g., as part of a simulation program such as MATLAB™.

In addition, other modifications are possible. For example, it should be understood that the described systems and techniques can analogously be used for other kinds of channel equalization. Moreover, while portions of the implementations have been described as being done in the digital domain, it should be understood that these portions could also be implemented in the analog domain. Also, various operations depicted in a flowchart or other figure can be skipped or performed out of order and still provide desirable results. Accordingly, all such modifications and other implementations are within the scope of the following claims.

What is claimed is:

1. A system comprising:
   an input configured to obtain a communications signal of a channel, where the communications signal includes video information;
   a first equalization unit to receive the communications signal and perform a time-invariant equalization, where the first equalization unit is responsive to a time-invariant channel response;
   a decision unit responsive to an output of the first equalization unit;
   an estimation unit to generate a time-varying channel response, where the estimation unit is responsive to an output of the decision unit; and
   a second equalization unit to perform a time-varying equalization, where the second equalization unit is responsive to an output of the estimation unit.

2. The system of claim 1, comprising: an initial response estimator configured to estimate the time-invariant channel response based on one or more pilot signals of the communications signal.

3. The system of claim 2, comprising:
   a one-dimensional Fast Fourier Transform unit coupled between the first equalization unit and the communications signal;
   a one-dimensional Inverse Fast Fourier Transform unit coupled between the estimation unit and the output of the decision unit; and
   a two-dimensional Fast Fourier Transform unit coupled between the second equalization unit and the output of the estimation unit.

4. The system of claim 2, where the decision unit is a first decision unit, the system comprising:
   a second decision unit responsive to an output of the second equalization unit; and
   an iteration control to determine whether to perform one or more iterations of time-varying channel response estimation, where the iteration control is responsive to the second decision unit.

5. The system of claim 1, where the communications signal of the channel conforms to a digital video broadcast standard.

6. The system of claim 1, comprising: circuits to receive signals from multiple different sources and to output a television signal to a display.

7. The system of claim 6, comprising a set top box.

8. The system of claim 6, where the circuits comprise high definition television (HDTV) signal processing and control circuits.

9. The system of claim 8, comprising the display.

10. A system comprising:
    a source device to transmit a communications signal over a channel;
    a receiver configured to obtain the communications signal from the channel and to equalize the communications signal by generating an initial decision signal for the communications signal in a frequency domain, converting the initial decision signal to a time domain, estimating one or more time-varying time-domain channel responses based on the converted initial decision signal, and removing channel effects from the communications signal using the one or more time-varying time-domain channel responses in the frequency domain.

11. The system of claim 10, where the receiver is further configured to equalize the communications signal by estimating a time-invariant channel response based on one or more pilot signals of the communications signal.

12. The system of claim 10, where the receiver is configured to convert the initial decision signal to the time domain using a one-dimensional Inverse Fast Fourier Transform, and the receiver is configured to use the one or more time-varying time-domain channel responses by first converting the one or more time-varying time-domain channel responses to the frequency domain using a two-dimensional Fast Fourier Transform.

13. The system of claim 10, where the receiver is further configured to equalize the communications signal by generating a second decision signal for the communications signal in the frequency domain, and determine whether to perform one or more iterations of time-varying channel response estimation based on the second decision signal.

14. The system of claim 10, where the communications signal of the channel conforms to a digital video broadcast standard.

15. The system of claim 10, further comprising a high definition television including the receiver.

16. The system of claim 10, further comprising a vehicle including the receiver.

17. The system of claim 10, further comprising a cell phone including the receiver.

18. The system of claim 10, further comprising a set top box including the receiver.

19. The system of claim 10, further comprising a media player including the receiver.

20. The system of claim 10, where the source device transmits an orthogonal frequency-division multiplexed (OFDM) signal.

* * * * *